(12) United States Patent
Yang et al.

(10) Patent No.: US 8,914,685 B2
(45) Date of Patent: *Dec. 16, 2014

(54) METHOD AND APPARATUS FOR ENCODING CHANNEL QUALITY INDICATOR AND PRECODING CONTROL INFORMATION BITS

(71) Applicant: InterDigital Technology Corporation, Wilmington, DE (US)

(72) Inventors: Rui Yang, Greenlawn, NY (US); Philip J. Pietraski, Huntington Station, NY (US); Eidad M. Zeira, Huntington, NY (US); Alexander Reznik, Titusville, NJ (US); Yongwen E. Yang, Hillsborough, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/766,211

(22) Filed: Feb. 13, 2013

(65) Prior Publication Data

US 2013/0166971 A1 Jun. 27, 2013

Related U.S. Application Data

(63) Continuation of application No. 13/246,199, filed on Sep. 27, 2011, now Pat. No. 8,407,534, which is a (Continued)

(51) Int. Cl.
| | |
|---|---|
| H04L 1/16 | (2006.01) |
| H04L 1/00 | (2006.01) |
| G06F 11/00 | (2006.01) |
| H04B 7/04 | (2006.01) |
| H04B 7/06 | (2006.01) |
| H04L 1/06 | (2006.01) |
| H04L 25/03 | (2006.01) |

(52) U.S. Cl.
CPC ............... *H04L 1/007* (2013.01); *H04L 1/0026* (2013.01); *H04B 7/0417* (2013.01);
(Continued)

(58) Field of Classification Search
USPC .............................................. 714/752; 455/69
See application file for complete search history.

(56) References Cited

U.S. PATENT DOCUMENTS

| | | |
|---|---|---|
| 5,950,124 A | 9/1999 | Trompower et al. |
| 6,052,408 A | 4/2000 | Trompower et al. |

(Continued)

FOREIGN PATENT DOCUMENTS

| | | |
|---|---|---|
| EP | 1622329 A1 | 2/2006 |
| JP | 2005-518136 A | 6/2005 |

(Continued)

OTHER PUBLICATIONS

Qualcomm Europe et al., "Definition of MIMO Operation on HS-PDSCH, Preferred Precoding and CQI Reporting Procedures, Modified CQI Tables", 3GPP TSG-RAN WG1 Meeting #47, R1-063573, Riga, Latvia, Nov. 6-10, 2006.*

(Continued)

*Primary Examiner* — Justin R Knapp
(74) *Attorney, Agent, or Firm* — Condo Roccia Koptiw LLP

(57) ABSTRACT

A method and apparatus for encoding channel quality indicator (CQI) and precoding control information (PCI) bits are disclosed. Each of the input bits, such as CQI bits and/or PCI bits, has a particular significance. The input bits are encoded with a linear block coding. The input bits are provided with an unequal error protection based on the significance of each input bit. The input bits may be duplicated based on the significance of each input bit and equal protection coding may be performed. A generator matrix for the encoding may be generated by elementary operation of conventional basis sequences to provide more protection to a most significant bit (MSB).

16 Claims, 10 Drawing Sheets

Related U.S. Application Data continuation of application No. 11/866,086, filed on Oct. 2, 2007, now Pat. No. 8,078,932.

(60) Provisional application No. 60/827,829, filed on Oct. 2, 2006, provisional application No. 60/855,682, filed on Oct. 30, 2006, provisional application No. 60/884,116, filed on Jan. 9, 2007, provisional application No. 60/887,829, filed on Feb. 2, 2007, provisional application No. 60/888,272, filed on Feb. 5, 2007, provisional application No. 60/888,867, filed on Feb. 8, 2007, provisional application No. 60/889,038, filed on Feb. 9, 2007, provisional application No. 60/895,093, filed on Mar. 15, 2007.

(52) U.S. Cl.
CPC ............ *H04L 1/0057* (2013.01); *H04L 1/1671* (2013.01); *H04B 7/0639* (2013.01); *G06F 11/006* (2013.01); *H04B 7/0636* (2013.01); *H04B 7/0652* (2013.01); *H04L 1/06* (2013.01); *H04B 7/0634* (2013.01); *H04B 7/0632* (2013.01); *H04L 2025/03802* (2013.01); *H04L 1/0073* (2013.01)
USPC ........... 714/701; 714/704; 714/708; 714/752; 455/69; 370/465

(56) References Cited

U.S. PATENT DOCUMENTS

| | | | |
|---|---|---|---|
| 6,282,187 B1 | 8/2001 | Evans et al. | |
| 6,341,125 B1* | 1/2002 | Hong et al. | 370/335 |
| 6,353,640 B1 | 3/2002 | Hessel et al. | |
| 6,671,328 B1 | 12/2003 | Poon et al. | |
| 6,813,506 B1* | 11/2004 | Song | 455/466 |
| 6,882,636 B1* | 4/2005 | Kim et al. | 370/342 |
| 7,020,126 B2* | 3/2006 | Choi et al. | 370/342 |
| 7,054,381 B2* | 5/2006 | Lim et al. | 375/295 |
| 7,180,902 B1 | 2/2007 | Raaf et al. | |
| 7,356,313 B2* | 4/2008 | Kaikkonen et al. | 455/101 |
| 7,388,856 B2 | 6/2008 | Kim et al. | |
| 7,463,673 B2* | 12/2008 | Fujii et al. | 375/211 |
| 7,573,806 B2 | 8/2009 | Ihm et al. | |
| 7,613,432 B2* | 11/2009 | Ishii et al. | 455/101 |
| 7,630,391 B2 | 12/2009 | Jin et al. | |
| 7,633,906 B2 | 12/2009 | Jin et al. | |
| 7,751,382 B2 | 7/2010 | Ranta-Aho et al. | |
| 7,801,496 B2* | 9/2010 | Kaikkonen et al. | 455/101 |
| 7,809,073 B2 | 10/2010 | Liu | |
| 7,965,780 B2 | 6/2011 | Lindoff et al. | |
| 7,991,092 B2 | 8/2011 | Jahan et al. | |
| 8,027,367 B2* | 9/2011 | Li et al. | 370/491 |
| 8,045,638 B2 | 10/2011 | Grant et al. | |
| 8,078,932 B2* | 12/2011 | Zeira et al. | 714/752 |
| 8,407,534 B2* | 3/2013 | Zeira et al. | 714/701 |
| 2002/0075838 A1 | 6/2002 | Choi et al. | |
| 2002/0154610 A1 | 10/2002 | Tiedemann, Jr. et al. | |
| 2003/0026350 A1 | 2/2003 | Lim et al. | |
| 2003/0137955 A1 | 7/2003 | Kim et al. | |
| 2004/0071358 A1 | 4/2004 | Xin et al. | |
| 2005/0105502 A1 | 5/2005 | Kim et al. | |
| 2006/0217088 A1 | 9/2006 | Nagaoka et al. | |
| 2009/0093265 A1 | 4/2009 | Kimura et al. | |

FOREIGN PATENT DOCUMENTS

| | | |
|---|---|---|
| JP | 2005-252388 A | 9/2005 |
| WO | WO 03/069807 A1 | 8/2003 |
| WO | WO 2006/004355 A1 | 1/2006 |
| WO | WO 2006/011699 A1 | 2/2006 |

OTHER PUBLICATIONS

3rd Generation Partnership Project (3GPP), R1-063573, "Definition of MIMO Operation on HS-PDSCH, Preferred Precoding and CQI Reporting Procedures, Modified CQI Tables", Qualcomm Europe, 3GPP TSG-RAN WG1 Meeting #47, R1-063573, Riga, Latviam, Nov. 6-10, 2006.

3rd Generation Partnership Project (3GPP), R1-063581, "Coding of HS-DPCCH to Support Operation of FDD MIMO", Qualcomm Europe, 3GPP TSG-RAN WG1 Meeting #47, R1-063581, Riga, Latvia, Nov. 6-10, 2006.

3rd Generation Partnership Project (3GPP), R1-063422, "Definition of HS-DPCCH Coding for FDD MIMO Operation in Rel-7", Qualcomm Europe, 3GPP TSG RAN WG1 #47, R1-063422, Riga, Latvia, Nov. 6-10, 2006.

3rd Generation Partnership Project (3GPP), TS 25.211 V6.7.0, "3rd Generation Partnership Project, Technical Specification Group Radio Access Network, Physical Channels and Mapping of Transport Channels onto Physical Channels (FDD) (Release 6)", 3GPP TS 25.211 V6.7.0, Dec. 2005.

3rd Generation Partnership Project (3GPP), TS 25.211 V6.8.0, "3rd Generation Partnership Project, Technical Specification Group Radio Access Network, Physical Channels and Mapping of Transport Channels onto Physical Channels (FDD) (Release 6)", 3GPP TS 25.211 V6.8.0, Sep. 2007.

3rd Generation Partnership Project (3GPP), TS 25.211 V7.0.0, "3rd Generation Partnership Project, Technical Specification Group Radio Access Network; Physical Channels and Mapping of Transport Channels onto Physical Channels (FDD) (Release 7)", 3GPP TS 25.211 V7.0.0, Mar. 2006.

3rd Generation Partnership Project (3GPP), TS 25.211 V7.3.0, "3rd Generation Partnership Project, Technical Specification Group Radio Access Network; Physical Channels and Mapping of Transport Channels onto Physical Channels (FDD) (Release 7)", 3GPP TS 25.211 V7.3.0, Sep. 2007.

3rd Generation Partnership Project (3GPP), TS 25.212 V6.5.0, "3rd Generation Partnership Project, Technical Specification Group Radio Access Network; Multiplexing and Channel Coding (FDD) (Release 6)", 3GPP TS 25.212 V6.5.0, Jun. 2005.

3rd Generation Partnership Project (3GPP), TS 25.212 V6.10.0, "3rd Generation Partnership Project, Technical Specification Group Radio Access Network; Multiplexing and Channel Coding (FDD) (Release 6)", 3GPP TS 25.212 V6.10.0, Dec. 2006.

3rd Generation Partnership Project (3GPP), TS 25.212 V7.1.0, "3rd Generation Partnership Project, Technical Specification Group Radio Access Network; Multiplexing and Channel Coding (FDD) (Release 7)", 3GPP TS 25.212 V7.1.0, Jun. 2006.

3rd Generation Partnership Project (3GPP), TS 25.212 V7.6.0, "3rd Generation Partnership Project, Technical Specification Group Radio Access Network; Multiplexing and Channel Coding (FDD) (Release 7)", 3GPP TS 25.212 V7.6.0, Sep. 2007.

3rd Generation Partnership Project (3GPP), TS 25.214 V6.8.0, "3rd Generation Partnership Project, Technical Specification Group Radio Access Network; Physical Layer Procedures (FDD) (Release 6)", 3GPP TS 25.214 V6.8.0, Mar. 2006.

3rd Generation Partnership Project (3GPP), TS 25.214 V6.9.0, "3rd Generation Partnership Project, Technical Specification Group Radio Access Network; Physical Layer Procedures (FDD) (Release 6)", 3GPP TS 25.214 V6.9.0, Jun. 2006.

3rd Generation Partnership Project (3GPP), TS 25.214 V6.11.0, "3rd Generation Partnership Project, Technical Specification Group Radio Access Network; Physical Layer Procedures (FDD) (Release 6)", 3GPP TS 25.214 V6.11.0, Dec. 2006.

3rd Generation Partnership Project (3GPP), 3GPP TS 25.214 V7.1.0, "3rd Generation Partnership Project, Technical Specification Group Radio Access Network; Physical Layer Procedures (FDD) (Release 7)", 3GPP TS 25.214 V7.1.0, Jun. 2006.

3rd Generation Partnership Project (3GPP), TS 25.214 V7.6.0, "3rd Generation Partnership Project, Technical Specification Group Radio Access Network; Physical Layer Procedures (FDD) (Release 7)", 3GPP TS 25.214 V7.6.0, Sep. 2007.

3rd Generation Partnership Project (3GPP), TS 25.212 V6.8.0, "3rd Generation Partnership Project, Technical Specification Group Radio Access Network; Multiplexing and Channel Coding (FDD) (Release 6)", 3GPP TS 25.212 V6.8.0, Jun. 2006.

(56) References Cited

OTHER PUBLICATIONS

3rd Generation Partnership Project (3GPP), R1#24-02-0362, "Comparison of CQI Coding Methods," LG Electronics, 3GPP TSG RAN WG 1 #24, TSG R1#24-02-0362, Feb. 16-22, 2002.
3rd Generation Partnership Project (3GPP), TS 25.222 V3.10.0, "3rd Generation Partnership Project, Technical Specification Group Radio Access Network; Multiplexing and channel coding (TDD) (Release 1999)," 3GPP TS 25.222 V3.10.0, Sep. 2002.
3rd Generation Partnership Project (3GPP), TS 25.222 V4.8.0, "3rd Generation Partnership Project; Technical Specification Group Radio Access Network; Multiplexing and channel coding (TDD) (Release 4)," 3GPP TS 25.222 V4.8.0, Sep. 2004.
3rd Generation Partnership Project (3GPP), TS 25.222 V5.7.0, "3rd Generation Partnership Project, Technical Specification Group Radio Access Network; Multiplexing and channel coding (TDD) (Release 5)," 3GPP TS 25.222 V5.7.0, Sep. 2004.
3rd Generation Partnership Project (3GPP), TS 25.222 V6.2.0, "3rd Generation Partnership Project, Technical Specification Group Radio Access Network; Multiplexing and channel coding (TDD) (Release 6)," 3GPP TS 25.222 V6.2.0, Dec. 2004.
3rd Generation Partnership Project (3GPP), TS 25.222 V7.0.0, "3rd Generation Partnership Project, Technical Specification Group Radio Access Network; Multiplexing and channel coding (TDD) (Release 7)," 3GPP TS 25.222 V7.0.0, Mar. 2006.
3rd Generation Partnership Project (3GPP), TS 25.222 V7.4.0, "3rd Generation Partnership Project, Technical Specification Group Radio Access Network; Multiplexing and channel coding (TDD) (Release 7)," 3GPP TS 25.222 V7.4.0, Sep. 2007.
European Telecommunications Standards Institute (ETSI), TS 25 212, V6.8.0, Universal Mobile Telecommunications System (UMTS); Multiplexing and channel coding (FDD), (3GPP TS 25.212 Version 6.8.0 Release 6), Jun. 2006.
3rd Generation Partnership Project (3GPP), TSGR#25-02-0653, "Consideration on Basis Sequences for CQI Coding", 3GPP TSG RAN WG 1 #25, Paris, France, Apr. 9-12, 2002, 1-4.
3rd Generation Partnership Project (3GPP), TS 25.213 V7.0.0, "3rd Generation Partnership Project, Technical Specification Group Radio Access Network; Spreading and Modulation (FDD) (Release 7)", 3GPP TS 25.213 V7.0.0, Mar. 2006.
3rd Generation Partnership Project (3GPP), R1-071376, "CQI Power Setting for rel-7 MIMO", Ericsson, TSG-RAN WG1 #48bis, St. Julian, Malta, R1-071376, Mar. 26-30, 2007, 3 pages.
3rd Generation Partnership Project (3GPP), TS 25.214 V7.4.0, "3rd Generation Partnership Project, Technical Specification Group Radio Access Network; Physical Layer Procedures (FDD) (Release 7)", 3GPP TS 25.214 V7.4.0, Mar. 2007, 1-76.

* cited by examiner

METHOD AND APPARATUS FOR ENCODING CHANNEL QUALITY INDICATOR AND PRECODING CONTROL INFORMATION BITS

CROSS REFERENCE TO RELATED APPLICATIONS

This application is a continuation of U.S. patent application Ser. No. 13/246,199, filed Sep. 27, 2011; which is a continuation of U.S. patent application Ser. No. 11/866,086, filed Oct. 2, 2007, now U.S. Pat. No. 8,078,932, issued Dec. 13, 2011; which claims the benefit of U.S. provisional application Nos. 60/827,829 filed Oct. 2, 2006, 60/855,682 filed Oct. 30, 2006, 60/884,116 filed Jan. 9, 2007, 60/887,829 filed Feb. 2, 2007, 60/888,272 filed Feb. 5, 2007, 60/888,867 filed Feb. 8, 2007, 60/889,038 filed Feb. 9, 2007, and 60/895,093 filed Mar. 15, 2007, all of which are incorporated by reference as if fully set forth.

FIELD OF INVENTION

The present invention is related to wireless communication systems.

BACKGROUND

In the conventional third generation partnership project (3GPP) wireless communication systems, the downlink data channel, (i.e., high speed downlink shared channel (HS-DSCH)), may carry different amounts of data using different spreading codes and different modulation and coding schemes (MCSs). The amount of data that can be delivered to a user equipment (UE) over the HS-DSCH depends in part on the downlink channel quality. The UE reports the downlink channel quality to a Node-B using a channel quality indicator (CQI). The Node-B schedules the downlink transmissions based on the CQI reported by the UE.

For generation of the CQI, the UE performs channel quality measurements. The channel quality measurements are converted into a CQI value. Conventionally, a CQI value between 1 and 31 is generated using a lookup table. This CQI value is then encoded into CQI bits that are sent over the uplink channel by the UE.

Multiple-input multiple-output (MIMO) is a scheme that both the UE and the Node-B use more than one antenna in transmission and reception. When MIMO is implemented, multiple data streams may be transmitted between the UE and the Node-B and the UE may need to report multiple CQI values to the Node-B. In addition to the CQI, the UE also sends precoding control information (PCI) to instruct the Node-B as to preferences for downlink precoding.

When in a non-MIMO mode, the UE sends a five (5) bit CQI to the Node-B. The CQI bits are encoded using a (20, 5) code. When in a MIMO mode, the UE may send two types of information to the Node-B. Type-A information is for support of two streams and type-B information is for support of a single stream. Type-A information currently requires ten (10) information bits: two (2) for PCI and eight (8) for CQI values, (e.g., four (4) CQI bits for each stream). Type-B information requires seven (7) information bits: five (5) for CQI and two (2) for PCI. Different bit combinations may be used, but generally type-A information requires more bits than type-B information. Type A and B information are interspersed in uplink transmission as instructed by the network.

The CQI bits in a non-MIMO mode, and type A and type B information bits are block coded using (20, 5), (20, 10), and (20, 7) codes, respectively, to a total 20 coded bits using a generator matrix including a plurality of basis vectors. A linear (20, 10) code with a minimum distance of 6 is currently used for the type A information. The basis sequences for encoding type A information is shown in Table 1. The basis sequences for the type-B code are a subset of the basis sequences for the type-A code. For type B information, a linear combination of the first seven (7) basis sequences of the (20, 10) code is used for a (20, 7) code which also results in a minimum distance of 6 that is not the lowest that can be found for a (20, 7) code.

TABLE 1

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ |
|---|---|---|---|---|---|---|---|---|---|---|
| 0 | [1] | [0] | [0] | [0] | [0] | [0] | [0] | [0] | [0] | [0] |
| 1 | [0] | [1] | [0] | [0] | [0] | [0] | [0] | [0] | [0] | [0] |
| 2 | [0] | [0] | [1] | [0] | [0] | [0] | [0] | [0] | [0] | [0] |
| 3 | [0] | [0] | [0] | [1] | [0] | [0] | [0] | [0] | [0] | [0] |
| 4 | [0] | [0] | [0] | [0] | [1] | [0] | [0] | [0] | [0] | [0] |
| 5 | [0] | [0] | [0] | [0] | [0] | [1] | [0] | [0] | [0] | [0] |
| 6 | [0] | [0] | [0] | [0] | [0] | [0] | [1] | [0] | [0] | [0] |
| 7 | [0] | [0] | [0] | [0] | [0] | [0] | [0] | [1] | [0] | [0] |
| 8 | [0] | [0] | [0] | [0] | [0] | [0] | [0] | [0] | [1] | [0] |
| 9 | [0] | [0] | [0] | [0] | [0] | [0] | [0] | [0] | [0] | [1] |
| 10 | [1] | [0] | [0] | [0] | [1] | [0] | [1] | [1] | [1] | [1] |
| 11 | [1] | [1] | [0] | [0] | [0] | [1] | [0] | [1] | [1] | [1] |
| 12 | [0] | [1] | [1] | [0] | [0] | [0] | [1] | [0] | [1] | [1] |
| 13 | [1] | [0] | [1] | [1] | [0] | [0] | [0] | [1] | [0] | [1] |
| 14 | [1] | [1] | [0] | [1] | [1] | [0] | [0] | [0] | [1] | [0] |
| 15 | [1] | [1] | [1] | [0] | [1] | [1] | [0] | [0] | [0] | [1] |
| 16 | [1] | [1] | [1] | [1] | [0] | [1] | [1] | [0] | [0] | [0] |
| 17 | [0] | [1] | [1] | [1] | [1] | [0] | [1] | [1] | [0] | [0] |
| 18 | [1] | [0] | [1] | [1] | [1] | [1] | [0] | [1] | [1] | [0] |
| 19 | [0] | [1] | [0] | [1] | [1] | [1] | [1] | [0] | [1] | [1] |

Since the CQI and PCI bits are transmitted to the Node-B without a cyclic redundancy check (CRC), the transmitted CQI bits may be incorrectly received. Consequently, incorrect CQI bits may be used for the downlink scheduling by the Node-B, which results in system capacity degradation. Unlike errors in other decoding, the size of the error matters in CQI decoding. The CQI value ranging from 1 to 31 is mapped to CQI values, an error in a most significant bit (MSB) would generate a bigger error than an error in a non-MSB. Conventional codes are designed to minimize the occurrence of any errors and do not necessarily minimize the average 'size' of the errors.

Therefore, it would be desirable to use codes that minimize the size of the errors. In addition or alternatively, a better code with a higher minimum distance and weight would improve the detection probability of type-B information.

SUMMARY

A method and apparatus for encoding CQI and PCI bits are disclosed. Each of input bits, such as CQI bits and/or PCI bits, has a particular significance. The input bits may be encoded with a linear block coding. The input bits are provided with an unequal error protection based on the significance of each input bit. The input bits may be duplicated based on the significance of each input bit and equal protection coding may be performed. A generator matrix for the encoding may be generated by elementary operation of conventional basis sequences to provide more protection to an MSB.

BRIEF DESCRIPTION OF THE DRAWINGS

A more detailed understanding may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

It should be noted that although the following description references the specific application of CQI and/or PCI, the coding scheme of the present invention is applicable to coding any information. It should also be noted that specific dimension of the generator matrices are given only as an example, not as a limitation, and the exact presentation of the code depends on the bit placement of PCI and CQI.

Figure 1:
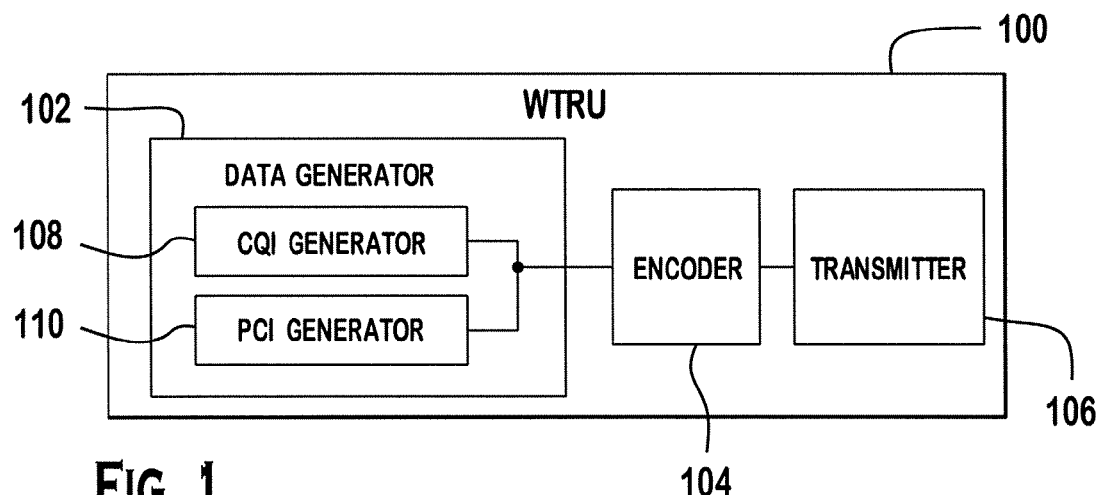
FIG. 1 is a block diagram of an example WTRU.

FIG. 1 is a block diagram of an example WTRU 100. The WTRU 100 may include a data generator 102, an encoder 104 and a transmitter 106. It should be noted that FIG. 1 shows only a transmit branch for simplicity and the WTRU 100 may further include any conventional processing components including a receiver and components in a receive branch. The data generator 102 may include a CQI generator 108 and/or a PCI generator 110. The CQI generator 108 generates at least one set of CQI bits. The PCI generator 110 generates PCI bits. The data generator 102 generates either CQI bits only, or type A or type B CQI/PCI bits. The CQI bits or the type A or type B CQI/PCI bits are encoded by the encoder 104. The detailed encoding schemes will be explained in detail below. The encoded CQI bits or CQI/PCI bits are transmitted by the transmitter 106.

Figure 2:
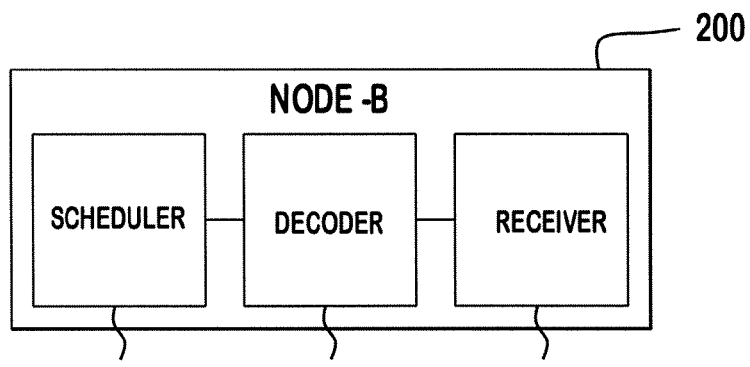
FIG. 2 is a block diagram of an example Node-B.

FIG. 2 is a block diagram of an example Node-B 200. The Node-B 200 may include a receiver 202, a decoder 204 and a scheduler 206. It should be noted that FIG. 2 shows only a receive branch for simplicity and the Node-B 200 may further include any conventional processing components including a transmitter and components in a transmit branch. The receiver 202 receives the encoded CQI bits or CQI/PCI bits from the WTRU 100. The decoder 204 decodes the encoded CQI or CQI/PCI bits to recover the CQI and/or PCI bits. The recovered CQI bits and/or PCI bits are used by the scheduler 206 for scheduling the next transmission to the WTRU 100.

In accordance with one embodiment, the error protection of the input bits is given in accordance with significance of each of the bits such that the most error protection is given to an MSB and a least protection is given to a least significant bit (LSB). The input bits can be thought of as a bit vector. For example, the range of the CQI value is 1 to 31, the CQI value is converted into 5 bit vector, $b=[b_0, \ldots, b_4]$, where $b_0$ is the MSB and $b_4$ is the LSB. It should be noted that the position of the MSB and the LSB may be opposite. The linear block coding may be described by an n×k generator matrix, where k is the number of input bits, (e.g., 5 CQI bits, 8 CQI bits and 2 PCI bits, or 5 CQI bits and 2 PCI bits), and n is the number of output bits, (e.g., 20 bits). The k input bits are multiplied by the generator matrix to produce an n-bit codeword as follows:

$$c = mG;  \quad \text{Equation (1)}$$

where c is the output codeword, m is the input vector and G is the generator matrix.

Each one of the output bits (elements in c) can be thought of a parity-check on a subset of bits in m. Which bits "participate" in each one of the parity check is determined by G. The more parity checks a particular bit participates in, the more redundancy is generated from it and the better protected it will be.

The input bits are ordered in descending or ascending need of protection. A list of k positive integers $m_0, \ldots m_{k-1}$, is generated such that:

$$n \geq m_0 \geq \ldots \geq m_{k-1} \geq 1 \quad \text{Equation (2)}$$

The generator matrix G is then generated as follows: the row of G corresponding to $b_i$, (i.e., row i+1), is populated with $m_i$ 1's and the rest of the entries are 0's. Thus, the input bits participate in progressively less and less parity checks and therefore incur progressively less error protection.

This method reduces the probability of large errors at the expense of the probability of much smaller errors which are insignificant to system performance. This offers substantial freedom in the design of the code and depending on the specific placement on 1's a code may turn out to be good or bad. In particular, the matrix G should remain full row-rank. The minimum number of 1's in any non-zero linear combination of the rows may be minimized. A pseudo-random code design is likely to result in a good code especially as block length increases. For very large lengths such codes are a sub-family of irregular low density parity check (LDPC) codes. Two alternative 5×20 generator matrix examples for the conventional CQI configuration are shown below (the MSB in the input vector is the leftmost bit and the LSB is the rightmost bit in this example).

GENERATOR MATRIX EXAMPLE 1

1 1 1 1 1 1 1 1 1 1 1 1 1 1 1 1 1 1 1 1
1 0 1 0 1 0 1 0 1 0 1 0 1 0 1 0 1 0 1 0
1 0 0 1 0 0 1 0 0 1 0 0 1 0 0 1 0 0 1 0
1 0 0 0 1 0 0 0 1 0 0 0 1 0 0 0 1 0 0 0
1 0 0 0 0 1 0 0 0 0 1 0 0 0 0 1 0 0 0 0.

GENERATOR MATRIX EXAMPLE 2

1 1 1 1 1 1 1 1 1 1 1 1 1 1 1 1 1 1 1 1
1 0 1 0 1 0 1 0 1 0 1 0 1 0 1 0 1 0 1 0
1 0 0 0 1 0 0 0 1 0 0 0 1 0 0 0 1 0 0 0
1 0 0 0 0 0 0 0 1 0 0 0 0 0 0 0 1 0 0 0
1 0 0 0 0 0 0 0 0 0 0 0 0 0 0 0 1 0 0 0.

The WTRU 100 may need to transmit two or more CQI values that pertain to a single stream or to two or more MIMO streams. In such a case, the WTRU 100 generates multiple CQI values and maps the CQI values to multiple sequences of CQI bits. For example, the WTRU 100 may generate three CQIs including one CQI for a single stream case and two CQIs for a two stream case. One of the CQI bits, (e.g., the single stream CQI bits), is denoted as a primary sequence (P), and the others are denoted as secondary sequences, (e.g., S'1 and S'2). Then, the primary and the secondary sequences are concatenated for coding according to the above coding scheme, (i.e., the input to the encoder 104 is defined as m=[P S'1 S'2]). Alternatively, the primary sequence and the secondary sequences may be combined, (e.g., S1=S'1-P and S2=S'2-P) and concatenated to be input into the encoder 104, (e.g., m=[P S1 S2]). Either way, the rows in the generator matrix should reflect the fact that the weights of the bits of m are now not exponential, although the weight of its components is.

Alternatively, the input bits may be unequally duplicated and then coded using an equal protection code, such as Reed-Muller (RM) code.

The CQI bits may be concatenated with acknowledgement information. In the 3GPP frequency division duplex (FDD) Release 6 standard, the high speed uplink control channel (HS-DPCCH) is constructed such that the first two time slots carry CQI information and the third time slot carries acknowledgement information, (i.e., positive acknowledgement (ACK) or negative acknowledgement (NACK)). Since the WTRU 100 usually generates a CQI value based on channel estimation prior to the CRC check on the received data block, the WTRU 100 may transmit the CQI first, and then transmit the ACK/NACK so that the latency in the link adaptation can be reduced. In order to preserve this advantage while using an unequal error protection coding scheme, the CQI bits and acknowledgement bits are concatenated and encoded as follows:

$$c = mG = [m_{CQI}\ m_{Ack}]G;\qquad \text{Equation (3)}$$

where $m_{CQI}$ is CQI bits, $m_{Ack}$ is acknowledgement information, and G is a generator matrix. For example, $m_{CQI}$ is a 1×5 row vector, $m_{Ack}$ is one bit for a single scream (in general 1×m row vector for m streams), and G is a 6×30 matrix with the first 20 elements in the last row being 0s.

This embodiment may be extended to encode a set of multiple codes which require different transmit time as follows:

$$[\vec{c}_1, \vec{c}_2, \ldots \vec{c}_N] = [\vec{m}_1, \vec{m}_2, \ldots \vec{m}_M] \begin{bmatrix} G_{11} & G_{12} & \ldots & G_{1N} \\ 0 & G_{22} & \ldots & G_{2N} \\ 0 & 0 & \ddots & \vdots \\ 0 & 0 & \ldots & G_{MN} \end{bmatrix}. \qquad \text{Equation (4)}$$

In accordance with another embodiment, the conventional 3GPP type A or type B code is changed by moving one or more bits in the generator matrix to improve the performance. The basis sequences for the new (20, 5) code generated in this way are shown in Table 2. The code is based on the conventional 3GPP (20,5) code in the non-MIMO mode. In Table 2, the fifth column corresponds to the MSB and the fourth column corresponds to the next MSB. The bit '1' in the fifth column and 20th row is changed to '0' and the bit '0' in the fourth column and 20th row is changed to '1' to give more protection to the next MSB at the expense of the MSB protection.

TABLE 2

| i | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| 1 | 0 | 1 | 0 | 0 | 1 |
| 2 | 1 | 1 | 0 | 0 | 1 |
| 3 | 0 | 0 | 1 | 0 | 1 |
| 4 | 1 | 0 | 1 | 0 | 1 |
| 5 | 0 | 1 | 1 | 0 | 1 |
| 6 | 1 | 1 | 1 | 0 | 1 |
| 7 | 0 | 0 | 0 | 1 | 1 |
| 8 | 1 | 0 | 0 | 1 | 1 |
| 9 | 0 | 1 | 0 | 1 | 1 |
| 10 | 1 | 1 | 0 | 1 | 1 |
| 11 | 0 | 0 | 1 | 1 | 1 |
| 12 | 1 | 0 | 1 | 1 | 1 |
| 13 | 0 | 1 | 1 | 1 | 1 |
| 14 | 1 | 1 | 1 | 1 | 1 |
| 15 | 0 | 0 | 0 | 0 | 1 |
| 16 | 0 | 0 | 0 | 0 | 1 |
| 17 | 0 | 0 | 0 | 0 | 1 |
| 18 | 0 | 0 | 0 | 0 | 1 |
| 19 | 0 | 0 | 0 | 1 | 0 |

Figure 3:
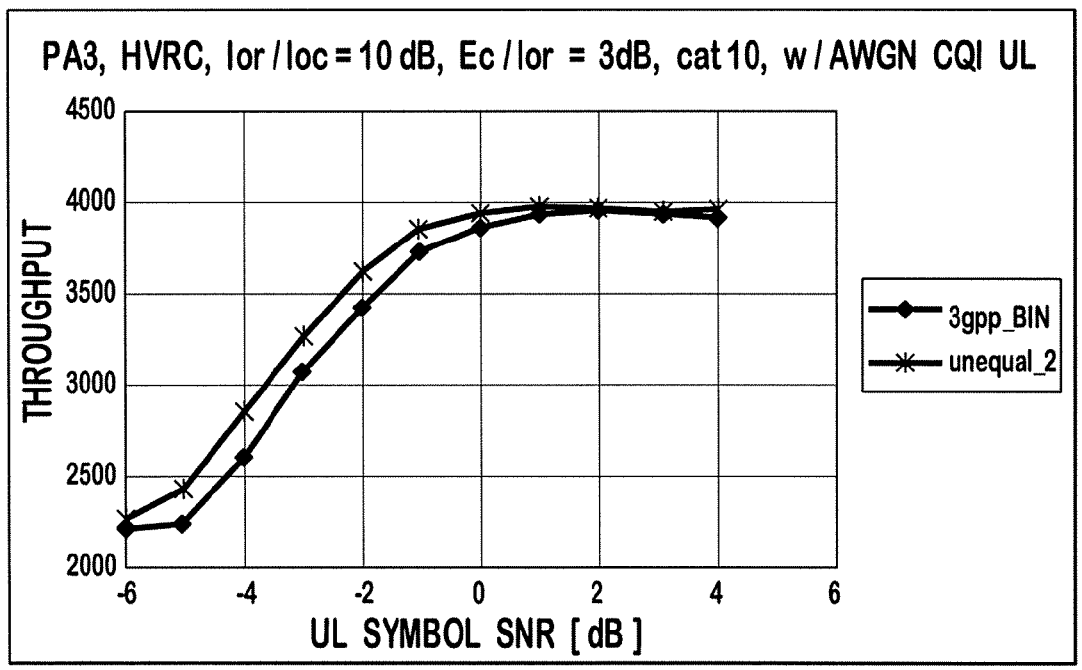
FIG. 3 shows throughput comparison between the conventional 3GPP CQI code and the above code modified in just one bit of its generator matrix.

FIG. 3 shows throughput comparison between the conventional 3GPP CQI code and the code in Table 2. FIG. 3 show the performance improvement with the new code.

The generator matrix in Table 2 or its variance may be generated by starting with a maximum minimum Hamming distance code of a size somewhat smaller than the desired code. For example, if a (20, 5) code is desired, a maximum minimum Hamming distance code of size (17, 5), (i.e., 5×17 generator matrix), is first found. Once the 5×17 generator matrix is found, the size of the generator matrix is extended by adding a 5×3 matrix Z of zeros to the 5×17 generator matrix. Thereafter, some or all of the zeros in the p-th row of the Z matrix are set to '1', where p corresponds to the position of the MSB in the data being encoded. This makes the distance between codewords with MSB=1 and those with MSB=0 larger, (i.e., more protection to the MSB). If not all elements in row p are set to '1', then the element in row q and in column that is not set to '1' in p-th row is set to '1' where q corresponds to the position of the next MSB in the data being encoded. In this way, the more important bits are better protected. However, it comes at the cost of having a minimum distance set by the smaller (n,k) code.

Generator matrix example 3 for an (20, 8) unequal error protection code generated in the similar way is shown below. The generator matrix example 3 is generated from a (17, 8) maximum minimum Hamming distance code. The right most 8×3 submatrix is added to the 8×17 matrix. In this example, the first row corresponds to the MSB and the second row corresponds to the next MSB. All elements of the submatrix are zeros, except the first row and the element in the second row and the last column for better protection of the next MSB.

GENERATOR MATRIX EXAMPLE 3

1 0 0 0 0 0 0 0 1 1 1 0 0 1 1 0 0 1 1 1

0 1 0 0 0 0 0 0 1 1 1 0 0 0 0 1 1 0 0 1

0 0 1 0 0 0 0 0 1 0 0 1 1 1 0 1 0 0 0 0

0 0 0 1 0 0 0 0 1 0 0 1 0 1 1 0 1 0 0 0

0 0 0 0 1 0 0 0 0 1 0 1 1 0 1 0 1 0 0 0

0 0 0 0 0 1 0 0 0 1 0 0 1 1 0 1 1 0 0 0

0 0 0 0 0 0 1 0 0 0 1 1 0 0 1 1 1 0 0 0

0 0 0 0 0 0 0 1 0 0 1 0 1 1 1 1 0 0 0 0.

Figure 4:
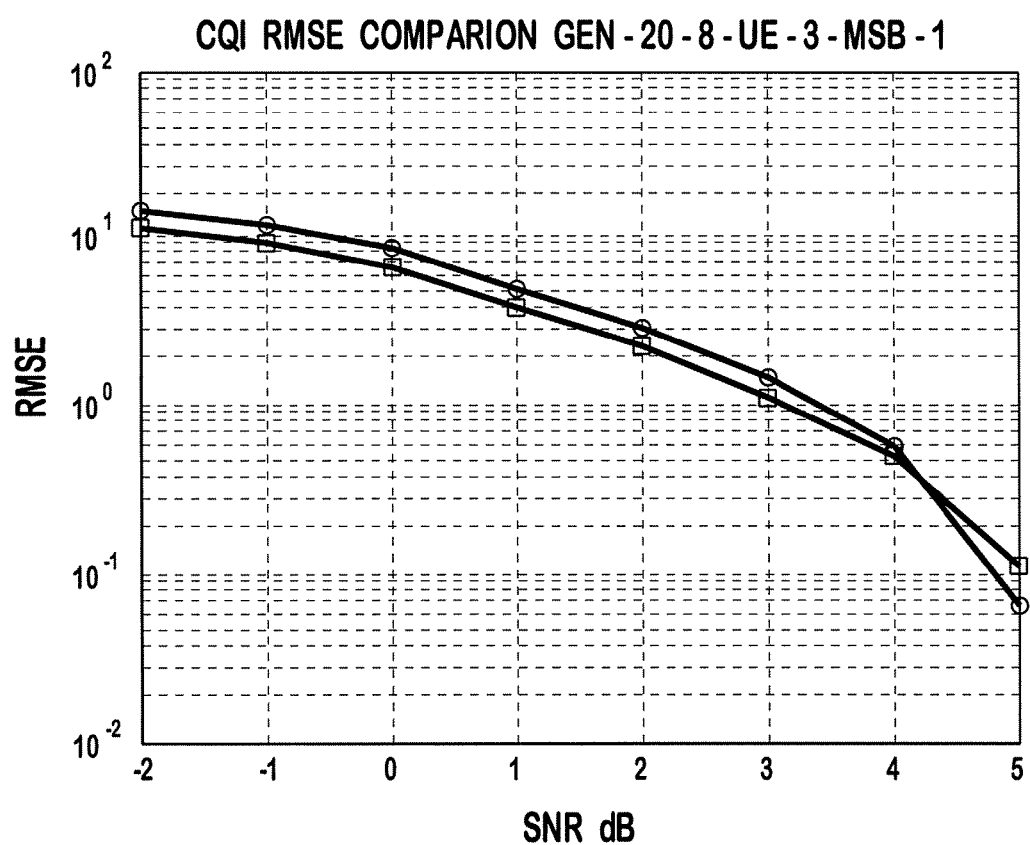
FIG. 4 shows an RMS error performance comparison between an unequal error protection code and a maximum minimum Hamming distance code.

FIG. 4 shows an RMS error performance comparison between an unequal error protection code constructed in accordance with this embodiment and a maximum minimum Hamming distance code. The RMS error is better for the unequal error protection code in accordance with this embodiment than the maximum minimum Hamming distance code in the region of interest.

In current 3GPP standards, type A information is coded with (20, 10) code and type B information is coded with a (20, 7) code which is a subset code of the (20, 10) code for the type A information. A subset code refers to the case where the basis vectors of the (20, 7) code are a subset of the basis vectors of the (20, 10) code.

In accordance with one embodiment, a non-subset, linear (20, 7) code is used for type B information and the conventional type A information coding (the (20, 10) coding specified in the current 3GPP standards) is used for type A information. The non-subset (20, 7) code may be the subset (20, 7) code of the conventional (20, 10) code with one (or more) bit flipping. The minimum distance of the (20, 7) code is eight (8). The non-subset (20, 7) code is generated such that the weight distribution of the code is non-optimal and the code offers better protection to the MSB of the CQI value. A generator matrix example 4 for this embodiment is shown below (in this example, the MSB in the input vector is the rightmost bit and the LSB is the leftmost bit).

GENERATOR MATRIX EXAMPLE 4

1 0 0 0 0 0 0 1 1 0 0 0 1 1 1 0 1 0 1 0

0 1 0 0 0 0 0 1 0 1 1 0 0 1 0 0 1 1 1 0

0 0 1 0 0 0 0 1 0 1 0 1 1 0 0 1 1 0 1 0

0 0 0 1 0 0 0 1 0 1 0 0 1 1 1 1 0 1 0 0

0 0 0 0 1 0 0 1 0 0 1 1 1 0 1 0 1 1 0 0

0 0 0 0 0 1 0 1 0 0 1 1 0 1 1 1 0 0 1 0

0 0 0 0 0 0 1 0 1 1 1 1 1 1 1 1 1 1 1 1.

A better protection of the MSB of CQI bits reduces the probability of large magnitude errors in CQI at the Node-B at the expense of a slightly higher probability of error. Both PCI errors and small magnitude CQI errors have a small impact on system performance while large magnitude CQI errors have a significant impact. Therefore, better error protection provided to the MSB of CQI bits is advantageous.

In accordance with another embodiment, a non-subset (20, 7) linear code that has a minimum distance of 8 is used and equal error protection is provided for type B information, and the conventional type A information coding (the (20, 10) coding specified in the current 3GPP standards) is used for type A information. One way of generating this non-subset (20, 7) code is to start with a good smaller code and search for extensions. A generator matrix example 5 for this embodiment is shown below (in this example, the MSB in the input vector is the rightmost bit and the LSB is the leftmost bit).

GENERATOR MATRIX EXAMPLE 5

1 0 0 0 0 0 0 1 1 0 0 0 1 1 1 0 1 0 1 0

0 1 0 0 0 0 0 1 0 1 1 0 0 1 0 0 1 1 1 0

0 0 1 0 0 0 0 1 0 1 0 1 1 0 0 1 1 0 1 0

0 0 0 1 0 0 0 1 0 1 0 0 1 1 1 1 0 1 0 0

0 0 0 0 1 0 0 1 0 0 1 1 1 0 1 0 1 1 0 0

0 0 0 0 0 1 0 1 0 0 1 1 0 1 1 1 0 0 1 1

0 0 0 0 0 0 1 0 1 1 1 1 1 1 1 1 1 1 1 1.

In accordance with another embodiment, for the case where CQI and PCI use 4 and 2 bits, respectively, approximately equal error protection code is used for type B information coding and the conventional type A information coding is used for type A information. A (20, 6) generator matrix example 6 for this embodiment is given below (in this example, the MSB in the input vector is the rightmost bit and the LSB is the leftmost bit).

GENERATOR MATRIX EXAMPLE 6

1 0 0 0 0 0 1 1 1 0 1 1 1 1 0 1 0 0 0 1
0 1 0 0 0 0 1 0 0 1 1 1 0 0 1 0 1 0 0 1
0 0 1 0 0 0 0 1 0 1 1 0 1 0 1 0 0 1 0 1
0 0 0 1 0 0 0 0 1 1 1 0 0 1 1 0 0 0 1 1
0 0 0 0 1 0 1 1 1 1 0 0 0 0 0 1 1 1 1 1
0 0 0 0 0 1 0 0 0 0 0 1 1 1 1 1 1 1 1 1.

In accordance with another embodiment, type B input bits are unequally duplicated before encoding. There are many variations on this scheme in which one or more of the CQI MSBs and/or some or all of the PCI bits are emphasized to create a 10-bit input to the (20, 10) encoder used for type A information coding. For example, the MSB of type B CQI may be repeated 3 times. Note that this is still a (20, 7) code with a generator matrix that can be constructed from linear combinations of the basis vectors of the generator matrix of the (20, 10) code.

In accordance with another embodiment, both type A and type B codes are changed from the conventional code and the type B code is a subset code comprising the first 7 columns of the type A code. A new type A generator matrix is created from the conventional (20, 10) generator matrix by using elementary column operations, (such as a column is altered by adding one other column to it). It is well known that these operations do not lead to codewords that are not also part of the original code. They do, however, enable construction of a better type B subset code.

The appropriate type B code can be determined in terms of its separation vector. For a linear (n,k) binary code C, the separation vector (SV) $s(G)=(s(G)_1, \ldots, s(G)_k)$ of length k with respect to a generator matrix G of C is defined by:

$$s(G)_i = \min\{wt(mG) | m \in GF(2)^k, m_i \neq 0\}, i=1, \ldots, k. \quad \text{Equation (5)}$$

It is generally understood that the value of an element of the SV corresponds to the protection that is given to the corresponding information bit akin to minimum distance properties of codes in general. Thus, for approximately equal error protection code, all the elements of the separation vector are equal. By finding codes with unequal element values, it is possible to protect better some desired information bits. Specifically, if a code is found that has $\min_i(s(G)_i) \geq 6$ with larger elements for the MSB of CQI bits, then this code is an improvement over the conventional type B coding without changing the properties of type A code.

For example, this code may be obtained by the following operations:

1) The 5th column basis sequence is replaced by the XOR operation of column 5 and column 8;

2) The 6th column basis sequence is replaced by the XOR operation of column 6 and column 9; and 3) The 7th column basis sequence is replaced by the XOR operation of column 7 and column 10.

The generator matrix obtained in this way (in a transpose form) with separating vector of $s(G1)=(7, 6, 6, 6, 7, 7, 7)$ is shown below.

GENERATOR MATRIX EXAMPLE 7

1 0 0 0 0 0 0 0 0 0
0 1 0 0 0 0 0 0 0 0
0 0 1 0 0 0 0 0 0 0
0 0 0 1 0 0 0 0 0 0
0 0 0 0 1 0 0 0 0 0
0 0 0 0 0 1 0 0 0 0
0 0 0 0 0 0 1 0 0 0
0 0 0 0 1 0 0 1 0 0
0 0 0 0 0 1 0 0 1 0
0 0 0 0 0 0 1 0 0 1
1 0 0 0 0 1 0 1 1 1
1 1 0 0 1 0 1 1 1 1
0 1 1 0 0 1 0 0 1 1
1 0 1 1 1 0 1 1 0 1
1 1 0 1 1 1 0 0 1 0
1 1 1 0 1 1 1 0 0 1
1 1 1 1 0 1 1 0 0 0
0 1 1 1 0 0 1 1 0 0
1 0 1 1 0 0 0 1 1 0
0 1 0 1 1 0 0 0 1 1.

Further coding examples may be obtained by permutation of the above codes or by starting with a smaller code and searching for the best extensions. Further generator matrix examples are provided herein.

GENERATOR MATRIX EXAMPLE 8

1 0 0 0 0 0 1 1 0 0 1 1 0 0 0 1 1 0
0 1 0 0 0 0 0 0 1 1 0 0 1 0 1 0 1 1 1
0 0 1 0 0 0 0 0 1 1 0 0 0 1 1 1 0 1 0
0 0 0 1 0 0 0 0 1 0 1 1 0 0 1 0 0 1 1
0 0 0 0 1 0 0 1 1 0 1 0 0 1 0 0 0 1 0 1
0 0 0 0 0 1 0 1 0 0 0 1 1 1 1 0 0 0 0 1
0 0 0 0 0 0 1 0 0 1 0 0 1 1 1 0 1 0 1 1
0 0 0 0 0 0 0 1 0 1 0 0 1 1 0 1 1 1 0 0
0 0 0 0 0 0 0 0 1 0 1 1 1 1 1 1 1 1 1 1
0 0 0 0 0 0 0 0 0 1 1 1 1 0 0 0 1 1 1 0.

GENERATOR MATRIX EXAMPLE 9

```
1 0 0 0 0 0 0 0 0 0 1 1 0 1 1 1 1 0 1 0
0 1 0 0 0 0 0 0 0 0 0 1 1 0 1 1 1 1 0 1
0 0 1 0 0 0 0 0 0 0 1 1 1 0 1 0 0 0 1 1
0 0 0 1 0 0 0 0 0 0 0 0 1 1 0 1 1 1 1 1
0 0 0 0 1 0 1 1 0 0 1 1 1 1 1 1 1 1 0 0
0 0 0 0 0 1 0 1 0 1 0 1 1 0 0 0 1 1 0 0
0 0 0 0 0 0 1 1 1 1 1 0 1 1 0 0 0 1 0 0
0 0 0 0 0 0 0 1 0 0 1 1 0 1 0 0 0 1 1 0
0 0 0 0 0 0 1 0 0 0 1 0 1 0 0 0 1 1 0 1
0 0 0 0 0 0 0 0 1 1 1 1 1 0 1 0 0 0 1.
```

GENERATOR MATRIX EXAMPLE 10

```
1 0 0 0 0 0 0 1 1 0 0 1 0 1 0 1 1 1 0
0 1 0 0 0 0 0 0 1 1 0 0 0 1 1 1 0 1 0 1
0 0 1 0 0 0 0 0 1 0 1 1 0 0 1 0 0 1 1 1
0 0 0 1 0 0 0 0 1 0 1 0 1 1 0 0 1 1 0 1
0 0 0 0 1 0 0 0 1 0 1 0 0 1 1 1 1 0 1 0
0 0 0 0 0 1 0 0 1 0 0 1 1 1 0 1 0 1 1 0
0 0 0 0 0 0 1 0 1 0 0 1 1 0 1 1 1 0 0 1
0 0 0 0 0 0 0 1 0 1 1 1 1 1 1 1 1 1 1 1
0 0 0 0 0 1 0 0 1 1 1 0 1 1 0 0 1 0 1 0
0 0 0 0 0 0 1 0 1 0 1 1 1 1 0 1 1 1 0.
```

GENERATOR MATRIX EXAMPLE 11

```
1 0 0 0 0 0 0 0 0 0 1 1 0 1 1 1 1 0 1 0
0 1 0 0 0 0 0 0 0 0 0 1 1 0 1 1 1 1 0 1
0 0 1 0 0 0 1 1 0 1 1 0 1 1 0 0 0 1 0 0
0 0 0 1 0 0 0 0 0 0 0 0 1 1 0 1 1 1 1 1
0 0 0 0 1 0 1 1 0 0 1 1 1 1 1 1 1 1 0 0
0 0 0 0 0 1 0 1 0 1 0 1 1 0 0 0 1 1 0 0
0 0 0 0 0 0 0 1 0 1 1 1 0 1 0 0 0 1 1
0 0 0 0 0 0 1 0 0 1 1 0 1 0 0 0 1 1 0
0 0 0 0 0 0 0 1 0 0 1 0 1 0 0 0 1 1 0 1
0 0 0 0 0 0 0 0 1 1 1 1 1 0 1 0 0 0 1.
```

GENERATOR MATRIX EXAMPLE 12

```
1 0 0 0 0 0 0 0 0 0 1 1 0 1 1 1 1 0 1 0
0 1 0 0 0 0 0 0 0 0 0 1 1 0 1 1 1 1 0 1
0 0 1 0 0 0 0 0 0 0 0 1 1 0 1 1 1 1 0
0 0 0 1 0 0 0 0 0 0 0 0 1 1 0 1 1 1 1
0 0 0 0 1 0 0 0 0 1 0 0 0 1 1 0 1 1 1
0 0 0 0 0 1 0 0 0 0 0 1 0 0 0 1 1 0 1 1
0 0 0 0 0 0 1 1 1 1 1 0 1 0 0 0 1 1 0 1
0 0 0 0 0 0 0 1 0 0 1 1 0 1 0 0 0 1 1 0
0 0 0 0 0 0 0 0 1 0 1 1 1 0 1 0 0 0 1 1
0 0 0 0 0 0 0 0 0 1 1 1 1 1 0 1 0 0 0 1.
```

GENERATOR MATRIX EXAMPLE 13

```
1 0 0 0 0 0 0 0 0 0 1 1 0 1 1 1 1 0 1 0
0 1 0 0 0 0 0 0 0 0 0 1 1 0 1 1 1 1 0 1
0 0 1 0 0 0 0 0 0 0 0 1 1 0 1 1 1 1 0
0 0 0 1 0 0 0 0 0 0 0 0 1 1 0 1 1 1 1
0 0 0 0 1 0 0 0 0 1 0 0 0 1 1 0 1 1 1
0 0 0 0 0 1 0 0 0 1 0 1 0 0 0 1 1 0 1 1
0 0 0 0 0 0 1 1 1 0 1 0 1 0 0 0 1 1 0 1
0 0 0 0 0 0 0 1 0 0 1 1 0 1 0 0 0 1 1 0
0 0 0 0 0 0 0 0 1 0 1 1 1 0 1 0 0 0 1 1
0 0 0 0 0 0 0 0 0 1 1 1 1 1 0 1 0 0 0 1.
```

GENERATOR MATRIX EXAMPLE 14

```
1 0 0 0 0 0 0 0 0 0 1 1 0 1 1 1 1 0 1 0
0 1 0 0 0 0 0 0 0 0 0 1 1 0 1 1 1 1 0 1
0 0 1 0 0 0 0 0 0 0 0 1 1 0 1 1 1 1 0
0 0 0 1 0 0 0 0 0 0 0 0 1 1 0 1 1 1 1
0 0 0 0 1 0 0 1 0 0 1 0 0 0 1 1 0 1 1 1
0 0 0 0 0 1 0 0 1 0 0 1 0 0 0 1 1 0 1 1
0 0 0 0 0 0 1 0 0 1 1 0 1 0 0 0 1 1 0 1
0 0 0 0 0 0 0 1 0 0 1 1 0 1 0 0 0 1 1 0
0 0 0 0 0 0 0 0 1 0 1 1 1 0 1 0 0 0 1 1
0 0 0 0 0 0 0 0 0 1 1 1 1 1 0 1 0 0 0 1.
```

Further subset coding examples may be created in the following manner. First, the 'best' type A code is identified. For example, for the (20,10) codes, it is known that there are 1,682 non-equivalent maximal minimum distance linear binary (20,10,6) codes having a minimum distance of six (6).

A maximal (n,k) minimum distance code is a code that achieves the theoretical maximum minimal distance between all pairs of codewords. Among these codes, codes with a lowest block error rate (BLER) are found. The BLER may be computed from its weight distribution. For the case of the (20,10) codes, the best code in the state of the art is unique and easily identified as it has a minimum distance of six (6) and the fewest number of minimum distance codewords (40) by a large margin. When looking for a good subset code, it is only needed to investigate the (20,10,6,40) codes from which to draw a subset code.

By taking an (n, k) code and applying any sequence of elementary operations, other codes are created whose codewords are either the same as the original codewords of (n,k) code, which makes the codes equivalent, or a smaller subset of those codewords. The codes with smaller subsets of codewords are degenerate and are not worth investigation. The others are potential candidates to be used to create a subset code.

For a (n, k) type A code, all sequences of elementary operations may be represented as a pre-multiplying kxk matrix of 1's and 0's to the generator matrix. The pre-multiplying matrix is called a translation matrix, (e.g., 10×10 or alternatively 7×10). The translation matrix may be generated deterministically or randomly. Each of these subset codes are then checked for good properties, such as achieving max min distance, counting the number of minimum weight codewords, and computation of the separation vector.

For all (20,10) coding examples, there are many bit mapping possibilities that may result in different coding properties. For example, there may be two CQI values of four (4) bits each mapped as pci0, pci1, cqi1_0, cqi1_1, cqi1_2, cqi1_3, cqi2_0, cqi2_1, cqi2_2, cqi2_3, where cqi1_3 and cqi2_3 are MSBs. This sequence is mapped to rows 1:10 of the generating matrix. Alternatively, the sequence may be mapped to rows 10:1 of the generator matrix in reverse order.

Alternatively, the two four bit CQI values may be combined into a single eight bit CQI composite (CQIC). For example, it has been proposed that CQIC={15*CQI1+CQI2+31} for two streams, and {SingleCQI} for one stream. CQI1 and CQI2 have 15 possible values each and SingleCQI has 30 possible values. Then, cqic7, cqic6, cqic5, cqic4, cqic3, cqic2, cqic1, pci1, pci0, cqic0 may be applied to rows 1:10 of the generator matrix, or alternatively 10:1 in reverse order. For type B (20, 7) coding, cqi4, cqi3, cqi2, cqi1, cqi0, pci1, pci0 may be mapped to rows 1:7, or alternatively 7:1 in reverse order. A generator matrix example 15 obtained in this way is shown below.

GENERATOR MATRIX EXAMPLE 15

1 0 0 0 0 0 0 0 0 0 1 1 0 1 1 1 1 0 1 0

0 1 0 0 0 0 0 0 0 0 0 1 1 0 1 1 1 1 0 1

0 0 1 0 0 0 0 0 1 1 1 0 0 0 0 1 1 1 1 1

0 0 0 1 0 0 0 1 0 0 1 1 1 1 0 0 1 1 0 0

0 0 0 0 1 0 0 1 1 0 1 1 0 0 0 1 1 0 0 1

0 0 0 0 0 1 0 0 1 0 1 1 1 0 0 1 0 1 1 0

0 0 0 0 0 0 1 1 0 1 1 1 1 0 0 1 1 0 1 0 0

0 0 0 0 0 0 0 1 0 0 1 1 1 0 1 0 0 0 1 1

0 0 0 0 0 0 0 0 1 1 0 1 0 1 0 1 1 1 0 0

0 0 0 0 0 0 0 0 0 1 1 1 1 1 0 1 0 0 0 1.

Type B PCI/CQI information coding results in lower transmitted power requirements due to different coding rate and coding gain. Such lower transmit power is desirable as it lowers the average uplink interference. Type A power level is currently determined by the network as a multiple of an uplink reference channel, (i.e., dedicated physical control channel (DPCCH). In accordance with the embodiments disclosed herein, different transmission powers are used for type A and type B information. Both type A and type B power may be independently defined, (i.e., as power multiplier or addition in dBs), in terms of the power of another channel. The multipliers or additions are provided by the network. The reference channel may be downlink channel or uplink channel. The downlink reference channel may be common pilot channel (CPICH), primary common control physical channel (P-CCPCH), synchronization channel (SCH), high speed shared control channel (HS-SCCH) or any other channel. The power of some of these channels may be defined in terms of power of other channels. The uplink reference channel may be DPCCH, enhanced uplink DPCCH (E-DPCCH), random access channel (RACH) (after ACK/NACK) or any other channel. Likewise, the power of some of these channels may be defined in terms of power of other channels.

After CQI bits are spread to the chip rate, the real-valued spread signals are weighted by a gain factor. The gain factor $\beta_{hs}$ for the CQI bits on the HS-DPCCH is derived from the quantized amplitude ratio ($A_{hs}=\beta_{hs}/\beta_c$), which is translated from $\Delta_{CQI}$ signaled by a higher layer. $\beta_c$ is the gain factor for the DPCCH. The translation of $\Delta_{CQI}$ into the quantized amplitude ratio $A_{hs}$ is shown in Table 3.

TABLE 3

| Signalled values for $\Delta_{CQI}$ | Quantized amplitude ratios $A_{hs} = \beta_{hs}/\beta_c$ |
|---|---|
| 9 | 38/15 |
| 8 | 30/15 |
| 7 | 24/15 |
| 6 | 19/15 |
| 5 | 15/15 |
| 4 | 12/15 |
| 3 | 9/15 |
| 2 | 8/15 |
| 1 | 6/15 |
| 0 | 5/15 |

For HS-DPCCH slots carrying CQI bits, if the WTRU is not configured in MIMO mode, $A_{hs}$ equals the quantized amplitude ratio translated from the signaled value $\Delta_{CQI}$. If the WTRU is configured in MIMO mode, $A_{hs}$ equals the quantized amplitude ratio translated from the signaled value $\Delta_{CQI}$ when a CQI of type B is transmitted, and $A_{hs}$ equals the quantized amplitude ratio translated from the signaled value $\Delta_{CQI}+1$ when a CQI of type A is transmitted.

Alternatively, once one of the type A or type B power is defined as explained above and transmission power for the other type may be determined as a network provided multiplier or dB addition or may be computed from the defined one based on a pre-defined formula. For example, type B power may be computed by the WTRU using a look up table ($LUT_A$). The $LUT_A$ may be used to compute type A power from an index $\Delta_{CQI}$ signaled by the network. Given $\Delta_{CQI}$, type B power may be computed using a separate lookup table $LUT_B$ that implements the function $P_B=LUT_B(\Delta_{CQI})$. An example $LUT_B$ is shown in Table 4.

TABLE 4

| Signalled values for $\Delta_{CQI}$ | Quantized amplitude ratios $A_{hs} = \beta_{hs}/\beta_c$ |
|---|---|
| 8 | 21/15 |
| 7 | 17/15 |
| 6 | 14/15 |
| 5 | 11/15 |
| 4 | 9/15 |
| 3 | 7/15 |
| 2 | 6/15 |
| 1 | 5/15 |
| 0 | 5/15 |

Alternatively, a function g that operates on $\Delta_{CQI}$ may be used to create an input to $LUT_A$ thus keeping the same set of power levels that are used for type A. This operation may be described as $P_B=LUT_A(g(\Delta_{CQI}))$. The function g may itself be implemented as a lookup table. For example, $g(\Delta_{CQI})$=maximum$(0, g(\Delta_{CQI})-1)$.

Figure 5:
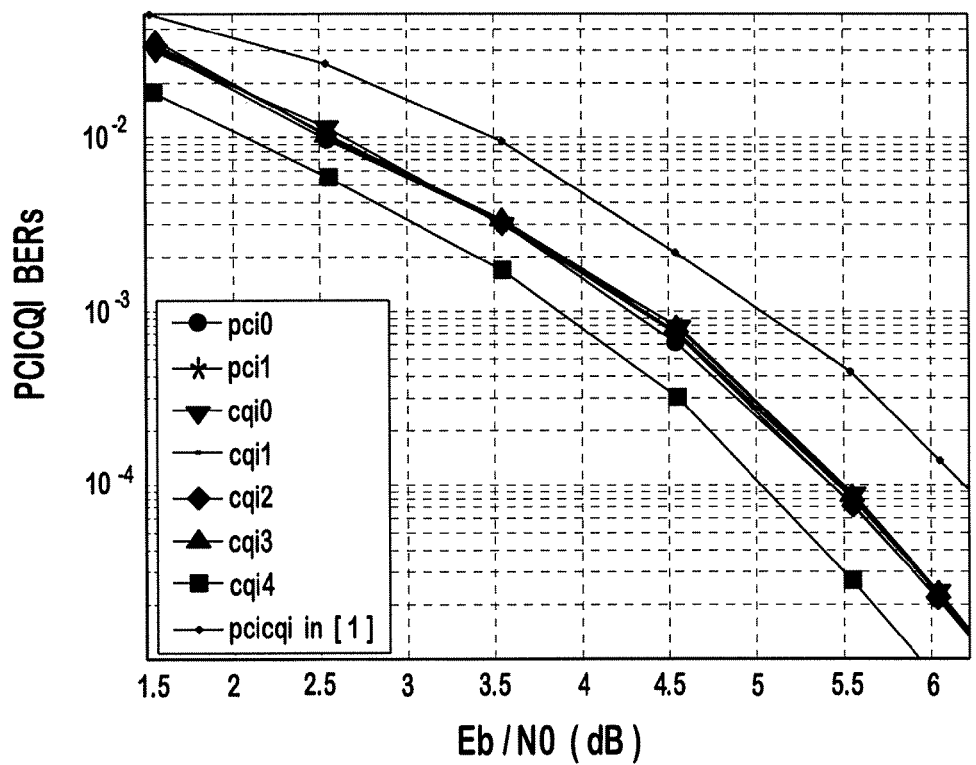
FIGS. 5-12 show simulation results for the coding scheme disclosed herein.
Figure 6:
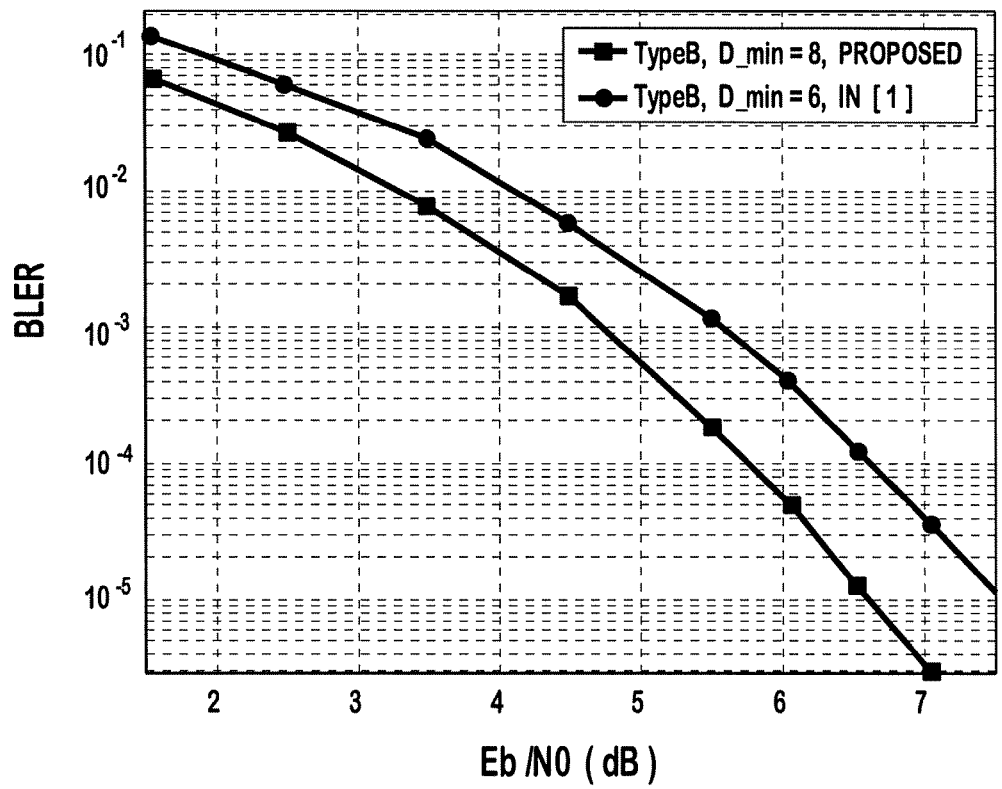
Figure 7:
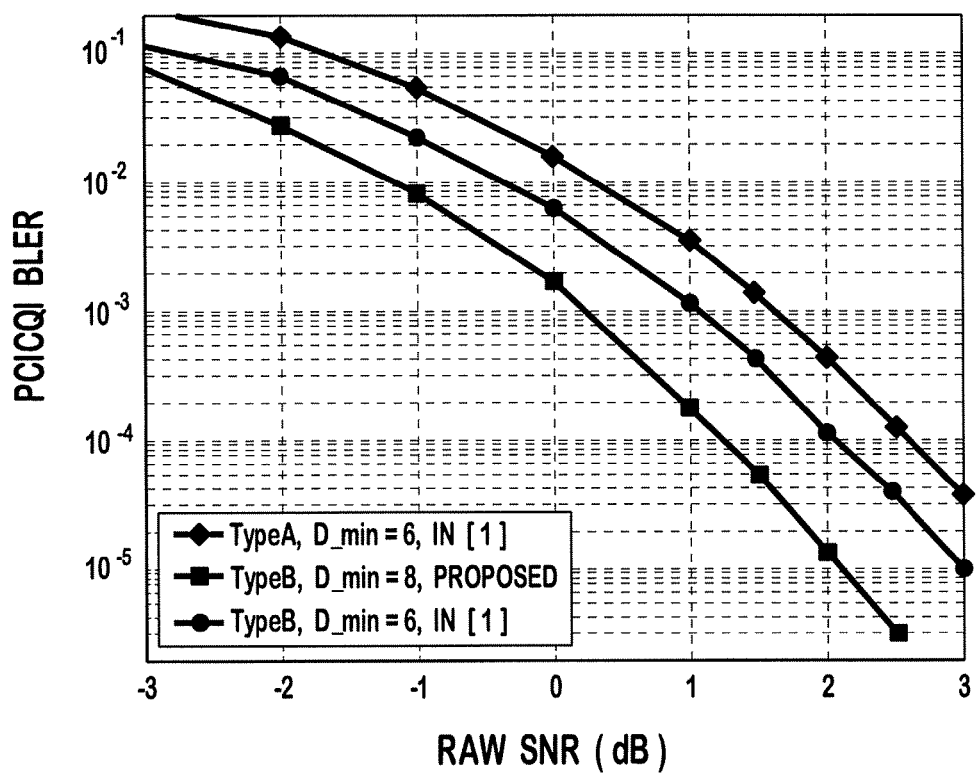
Figure 8:
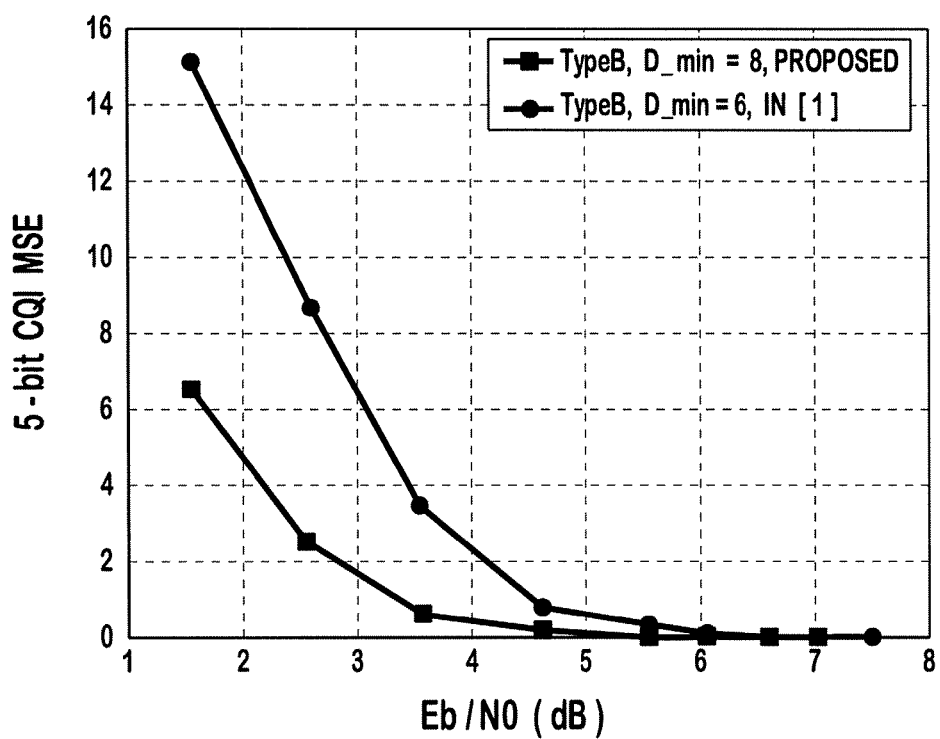

FIG. 5 shows an individual bit error rate using the generator matrix example 4. It shows that the MSB of CQI bits (cqi4) is about 0.6 dB better than the rest of PCI/CQI bits. As a reference, the bit error rate of the conventional coding scheme (labeled as "pcicqi in [1]") is also plotted. The BER measurement using the generator matrix example 4 is about 0.8 dB better than the conventional coding scheme. FIG. 6 shows a block error rate (BLER) for the conventional type B 7-bit PCI/CQI and the coding using the fourth generator matrix example. At 1% BLER, there is about a 0.8 dB difference in coding again. FIG. 7 shows BLER vs. the coded bit signal-to-noise ratio (SNR) for the conventional type A 10 bit PCI/CQI, conventional type B 7-bit PCI/CQI and the coding using the fourth generator matrix example. For comparison between the type A and type B reporting formats, the power required at 1% BLER for type A PCI/CQI format is about 1.5 dB higher than the one using the generator matrix example 8 for type B. FIG. 8 is a plot of CQI mean square error (MSE) measurement in two type B coding schemes. For the same amount of MSE errors, there is about >1 dB in SNR required.

Figure 9:
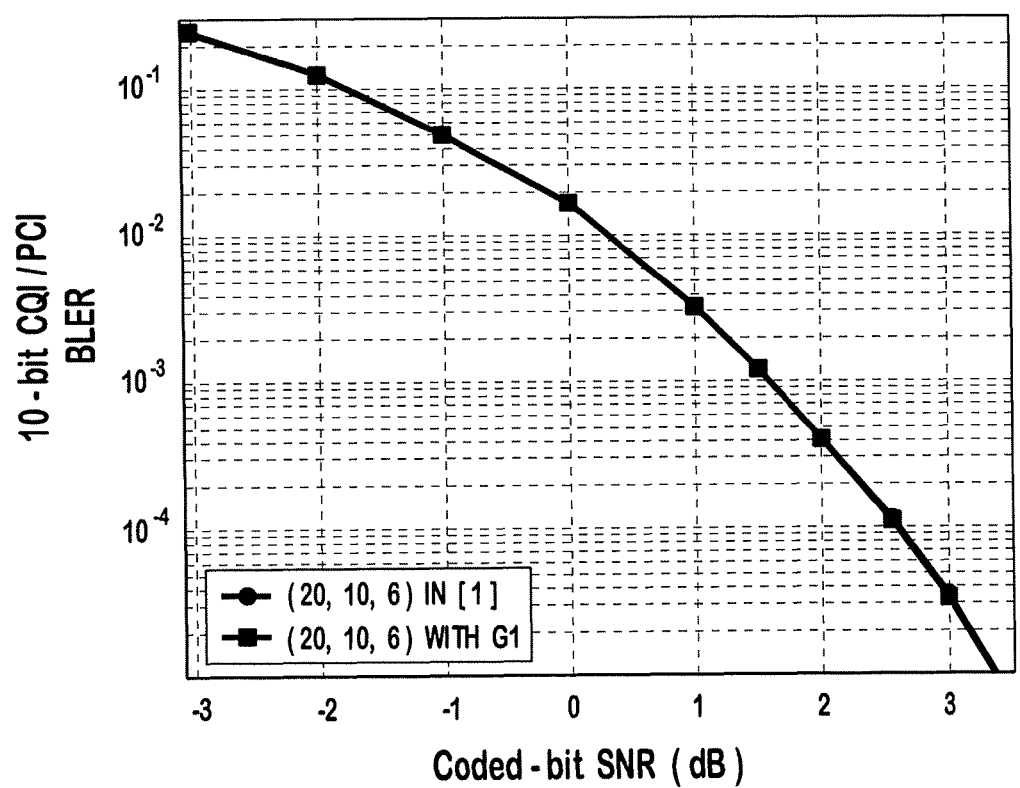
Figure 10:
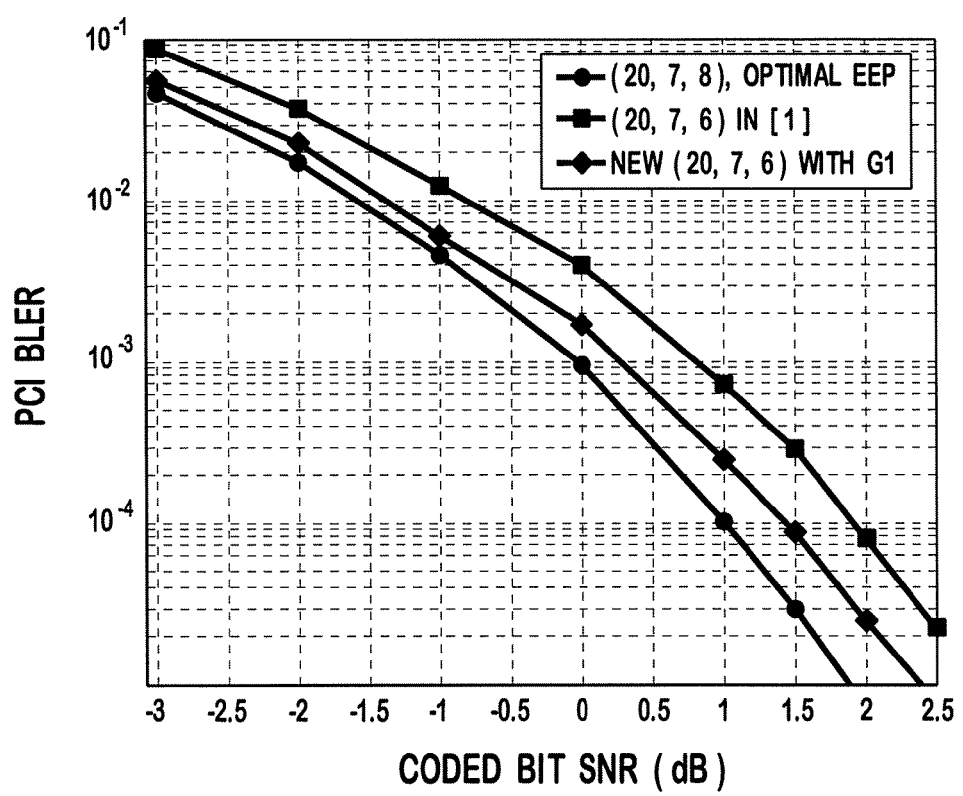
Figure 11:
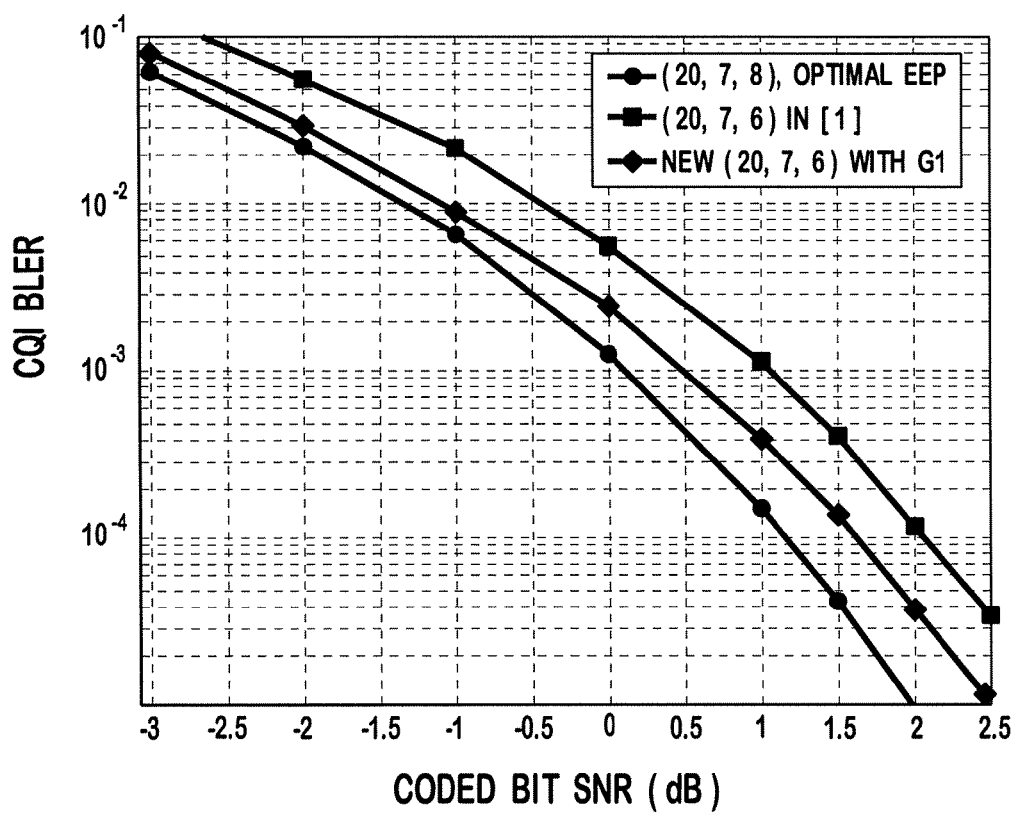
Figure 12:
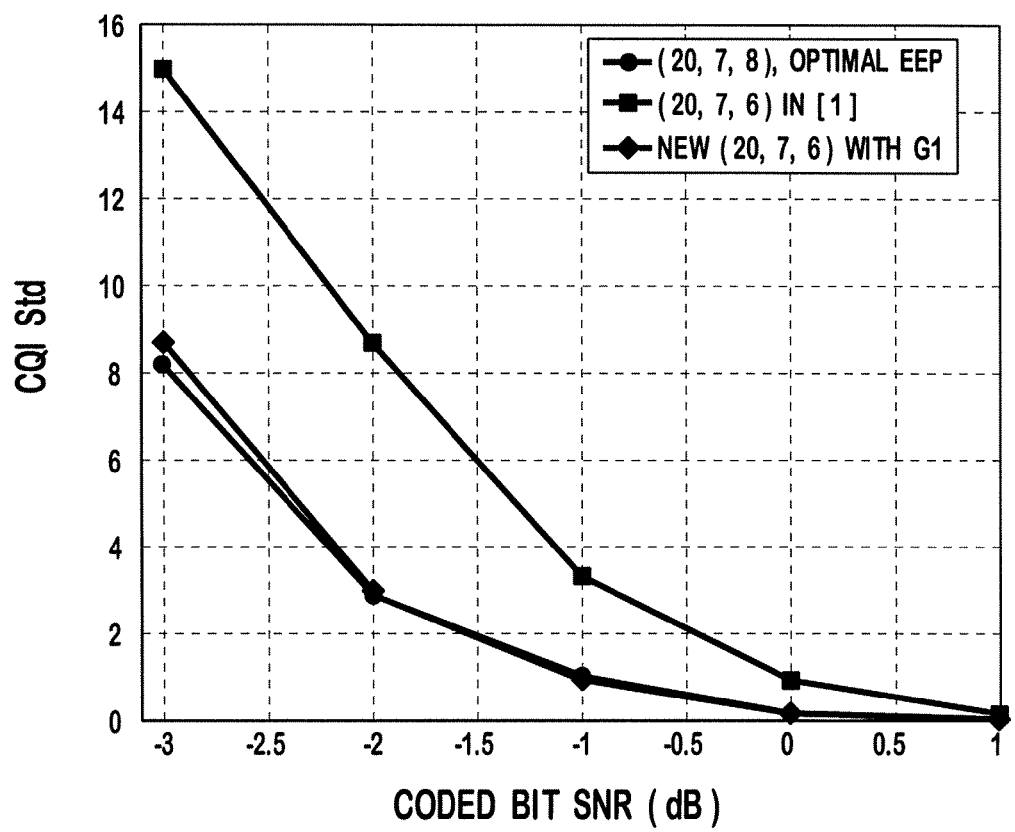

FIGS. 9-12 show performance comparisons for conventional coding and the coding using the fifth and/or the seventh generator matrix examples. Note that in FIGS. 9-12, "[1]" refers to prior art for type-B, "optimal EEP" represents the case using the fifth generator matrix example, and "G1" represents the case using the seventh generator matrix example. FIG. 9 shows that type-A matrix transformation does not change the BLER of type-A code. FIG. 10 shows a comparison for PCI BLER for prior art type-B code, the case using the fifth generator matrix example and the case using the seventh generator matrix example. FIG. 11 shows a graphical comparison of CQI BLER for the prior art type-B code, the case using the fifth generator matrix example and the case using the seventh generator matrix example. FIG. 12 shows comparison of CQI standard deviation, (computed as root mean square error (RMSE)), for prior art type-B coding, and the case using the fifth generator matrix example and the case using the seventh generator matrix example. As can be seen in FIGS. 9-12, both the fifth and the seventh generator matrix examples perform better than the prior art.

Although the features and elements are described in the embodiments in particular combinations, each feature or element can be used alone without the other features and elements of the embodiments or in various combinations with or without other features and elements of the embodiments. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:
1. A method comprising:
   determining a quantized amplitude ratio based on whether multiple-input multiple-output (MIMO) mode is configured, wherein on a condition that MIMO mode is configured, the determining is based on a channel quality indicator (CQI) type; and
   deriving a gain factor based on the quantized amplitude ratio.
2. The method of claim 1, wherein the quantized amplitude ratio is translated from a variable, and the value of the variable for CQI of type A is greater than the value of the variable for CQI of type B.
3. The method of claim 1, wherein the quantized amplitude ratio is translated from a variable, and the variable equals a signaled value ΔCQI signaled by a higher layer on a condition that MIMO mode is not configured.
4. The method of claim 1, further comprising weighting a real-valued spread value using the gain factor.
5. The method of claim 4, wherein the real-valued spread value comprises CQI bits, the quantized amplitude ratio is translated from a variable, and the variable equals a signaled value ΔCQI plus one on a condition that MIMO mode is configured and the CQI bits are of type A.
6. The method of claim 5, wherein the signaled value ΔCQI is signaled by a higher layer.
7. The method of claim 4, wherein the real-valued spread value comprises CQI bits, the quantized amplitude ratio is translated from a variable, and the variable equals a signaled value ΔCQI on a condition that MIMO mode is configured and the CQI bits are of type B.

8. The method of claim 1, wherein the quantized amplitude ratio is translated to 38/15 on a condition that a signaled value ΔCQI equals to 9.

9. A wireless transmit/receive unit (WTRU) comprising:
a processor configured to:
determine a quantized amplitude ratio based on whether multiple-input multiple-output (MIMO) mode is configured, wherein on a condition that MIMO mode is configured, the processor is configured to determine the quantized amplitude ratio based on a channel quality indicator (CQI) type, and
derive a gain factor based on the quantized amplitude ratio.

10. The WTRU of claim 9, wherein the quantized amplitude ratio is translated from a variable, and the value of the variable for CQI of type A is greater than the value of the variable for CQI of type B.

11. The WTRU of claim 9, wherein the quantized amplitude ratio is translated from a variable, and the variable equals a signaled value ΔCQI signaled by a higher layer on a condition that MIMO mode is not configured.

12. The WTRU of claim 9, wherein the processor is configured to weight a real-valued spread value using the gain factor.

13. The WTRU of claim 12, wherein the real-valued spread value comprises CQI bits, the quantized amplitude ratio is translated from a variable, and the variable equals a signaled value ΔCQI plus one on a condition that MIMO mode is configured and the CQI bits are of type A.

14. The WTRU of claim 13, wherein the signaled value ΔCQI is signaled by a higher layer.

15. The WTRU of claim 12, wherein the real-valued spread value comprises CQI bits, the quantized amplitude ratio is translated from a variable, and the variable equals a signaled value ΔCQI on a condition that MIMO mode is configured and the CQI bits are of type B.

16. The WTRU of claim 9, wherein the quantized amplitude ratio is translated to 38/15 on a condition that a signaled value ΔCQI equals to 9.

* * * * *